UNITED STATES PATENT OFFICE.

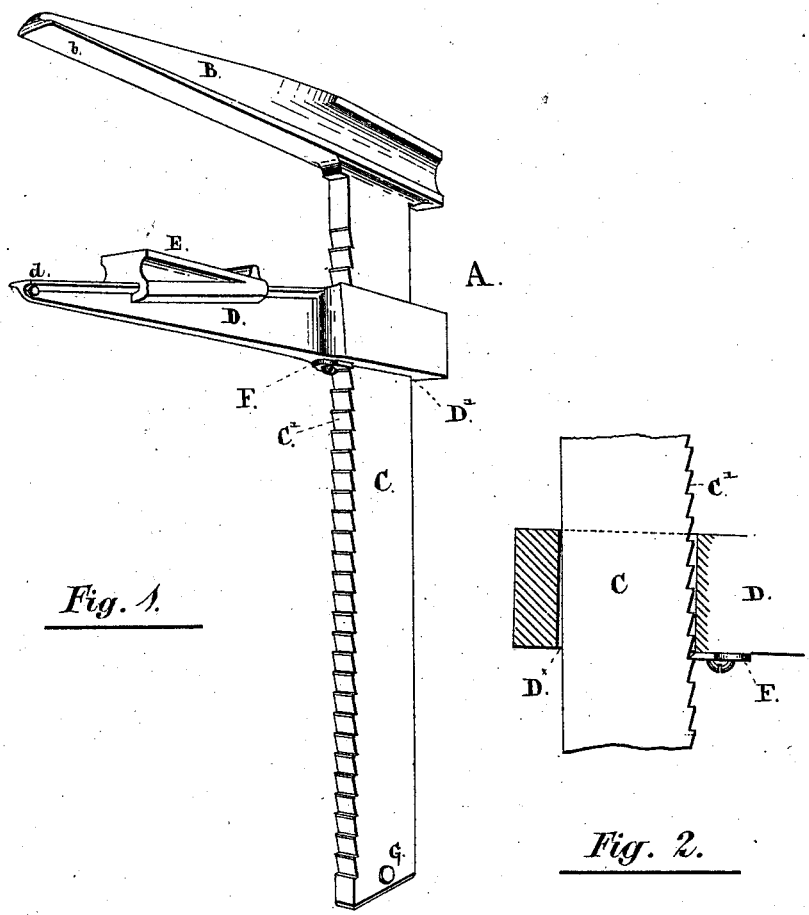

THOMAS H. MARSH, OF TORONTO, CANADA.

IMPROVEMENT IN CLAMPS.

Specification forming part of Letters Patent No. 176,752, dated May 2, 1876; application filed March 28, 1876.

*To all whom it may concern:*

Be it known that I, THOMAS HERBERT MARSH, of the city of Toronto, Province of Ontario, Canada, have invented an Improvement in Clamps, of which the following is a specification:

My invention has relation to an improvement in that class of clamps in which two jaws are placed at an acute angle to each other, the lower jaw being fitted with a sliding wedge, having a face parallel with the upper jaw; and my improvements consist in constructing the jaws in two separate parts, the upper jaw having attached at the large end, at or about a right angle, a downwardly-projecting stem or bar of any suitable length. On this bar the lower jaw is arranged to slide freely up and down, and is held at any desired point, by an attached steel tooth fitting into any one of the notches cut at regular intervals on the front face of the said stem or bar.

The object of my invention is to remedy an objection urged against the clamp in which similarly-diverging jaws are connected together, and constructed in but one piece, that objection being lack of capacity to meet the general requirements of the tradesman.

In the accompanying drawings, Figure 1 is a perspective view of a clamp constructed according to my invention. Fig. 2 is a detail of the end of the adjustable sliding jaw.

A is the clamp; B, the upper jaw; C, the downwardly-projecting stem, and D the movable lower jaw, fitted with the sliding wedge E. The back end of the jaw D is formed with an eye, D', through which eye the stem C is passed. On the front face of the said stem notches C' are cut at regular intervals, into which the steel tooth F, attached to the jaw D, is adjusted to catch and to seat itself when pressure is applied to the jaw, as in clamping. The eye D' is made sufficiently long to allow the tooth F to fit closely to the bottom of the notches, as shown in Fig. 2. The working-faces *b* and *d* of the jaws are flanged out to a suitable width to form a good bearing-surface, the web of the jaws gradually diminishing in depth from the head to the point. The lower jaw is prevented from slipping off the stem by a projecting stud or rivet-head, G, fastened near the end of the stem.

In operating, the lower jaw is slipped up or down the stem, as required, until the jaws are, approximately, the right distance apart, the clamping then being effected by forcing the wedge up the inclined face of the jaw, as in the case of the clamp, in which both jaws are stationary.

I make no claim to the jaws B and D when they are cast or formed in one piece; neither do I claim the sliding wedge E, as I am aware that the jaws so constructed and the wedge are covered in a patent granted to one Israel Kinney; the said Kinney having since transferred to me, by assignment, all his right, title, and interest in and to the said patent.

I do not limit myself to the precise manner of attaching the movable jaw to the stem C, as there are other methods easily devised of forming a connection; but

I claim as my invention—

In a clamping-tool, A, the adjustable jaw D, with sliding wedge E attached, and tooth F, in combination with the notched stem or bar C, attached to, and projecting downwardly from, the jaw B, arranged and operating substantially as described, and for the purpose specified.

Toronto, June 18, 1875.

THOMAS HERBERT MARSH.

In presence of—
GEO. A. AIRD,
JAMES PEACOCKE.